(12) United States Patent
Peng

(10) Patent No.: US 12,548,261 B2
(45) Date of Patent: Feb. 10, 2026

(54) INFORMATION PROCESSING METHOD AND DEVICE

(71) Applicant: Beijing Zitiao Network Technology Co., Ltd., Beijing (CN)

(72) Inventor: Shuxue Peng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 233 days.

(21) Appl. No.: 18/465,540

(22) Filed: Sep. 12, 2023

(65) Prior Publication Data

US 2024/0096023 A1 Mar. 21, 2024

(30) Foreign Application Priority Data

Sep. 15, 2022 (CN) .......................... 202211124877.2

(51) Int. Cl.
*G06T 19/00* (2011.01)
*G06T 7/73* (2017.01)

(52) U.S. Cl.
CPC ............... *G06T 19/00* (2013.01); *G06T 7/74* (2017.01)

(58) Field of Classification Search
CPC .............. G06T 19/00; G06T 7/74; G06T 7/70
See application file for complete search history.

(56) References Cited

U.S. PATENT DOCUMENTS

2021/0279949 A1* 9/2021 Cao ..................... G06T 17/00
2022/0366597 A1* 11/2022 Nandipati .......... G02B 27/0172
(Continued)

FOREIGN PATENT DOCUMENTS

| CN | 109633544 A | 4/2019 |
|---|---|---|
| CN | 114009003 A | 2/2022 |
| CN | 114200895 A | 3/2022 |

(Continued)

OTHER PUBLICATIONS

Youngseok Jang and Hojoon Shin and H. Jin Kim, "Pose Correction Algorithm for Relative Frames between Keyframes in SLAM", Computer Vision—ACCV 2020: 15th Asian Conference on Computer Vision, Kyoto, Japan, Nov. 30-Dec. 4, 2020, Revised Selected Papers, Part VI pp. 326-340 (Year: 2020).*

(Continued)

*Primary Examiner* — Zhengxi Liu
*Assistant Examiner* — Xiaoming Wei
(74) *Attorney, Agent, or Firm* — Alleman Hall LLP

(57) ABSTRACT

Embodiments of the present disclosure provide an information processing method and device, the method includes: in response to detecting first change information that a three dimensional map is changed, determining second change information of an anchor point based on the first change information, the anchor point being pre-associated with a first image frame of the three dimensional map; adjusting a pose of the anchor point based on the second change information. According to the method in the present disclosure, when the three dimensional map is changed, the anchor point of the three dimensional map can change with the change of the first image frame with which the anchor point is associated, so that the display of the anchor point remains relatively stable, and the problem that the display of the anchor point is stagger when the three dimensional map is changed is avoided.

16 Claims, 4 Drawing Sheets

(56) References Cited

U.S. PATENT DOCUMENTS

| | | | |
|---|---|---|---|
| 2023/0281867 A1* | 9/2023 | Peng | G06T 7/60 |
| | | | 382/103 |
| 2024/0036586 A1* | 2/2024 | Lampacrescia | G05D 1/242 |

FOREIGN PATENT DOCUMENTS

| | | |
|---|---|---|
| CN | 114341773 A | 4/2022 |
| CN | 114820784 A | 7/2022 |

OTHER PUBLICATIONS

X. Peng, Z. Liu, Q. Wang, Y.-T. Kim, M. Jeon and H.-S. Lee, "Accurate Visual-Inertial SLAM by Feature Re-identification," 2021 IEEE/RSJ International Conference on Intelligent Robots and Systems (IROS), Prague, Czech Republic, 2021, pp. 9168-9175, doi: 10.1109/IROS51168.2021.9636186. (Year: 2021).*

* cited by examiner

INFORMATION PROCESSING METHOD AND DEVICE

CROSS-REFERENCE TO RELATED APPLICATIONS

This application claims priority to Chinese Patent Application No. 2022111248772, filed on Sep. 15, 2022, which is hereby incorporated by reference in its entirety.

TECHNICAL FIELD

Embodiments in the present disclosure relate to the field of image processing technology and, in particular, to an information processing method and device.

BACKGROUND

Augmented reality (AR) is a technology that integrates a real scene with a virtual object and uses the virtual object to supplement the real scene.

With the development of the augmented reality technology, the AR technology has been more and more applied in various fields, which has brought great visual impacts to people.

The inventor found that in the implementation of the existing augmented reality technology, if a three-dimensional reality scene changes, the problem that display of an anchor point added to the reality scene will be stagger occurs.

SUMMARY

Embodiments of the present disclosure provide an information processing method and device, for overcoming the problem that display of an anchor point added to the reality scene is stagger when the three-dimensional reality scene changes in the implementation of the existing augmented reality technology.

In a first aspect, one or more embodiments of the present disclosure provide an information processing method, including: in response to detecting first change information that a three dimensional map is changed, determining second change information of an anchor point based on the first change information, the anchor point being pre-associated with a first image frame of the three dimensional map; adjusting a pose of the anchor point based on the second change information.

In a second aspect, one or more embodiments of the present disclosure provide an information displaying apparatus, including: a first determining unit, configured to: in response to detecting first change information that a three dimensional map is changed, determine second change information of an anchor point based on the first change information, the anchor point being pre-associated with a first image frame of the three dimensional map; an adjusting unit, configured to adjust a pose of the anchor point based on the second change information.

In a third aspect, one or more embodiments of the present disclosure provide an electronic device, including at least one processor and a memory; the memory stores computer executing instructions; the at least one processor executes the computer executing instructions stored in the memory, so that the at least one processor executes the information processing method described in the first aspect above and in various possible designs of the first aspect.

In a fourth aspect, one or more embodiments of the present disclosure provide a computer readable storage medium, in which computer execution instructions are stored, when at least one processor executes the computer execution instructions, the information processing method as described in the first aspect and various possible designs of the first aspect is implemented.

In a fifth aspect, one or more embodiments of the present disclosure provide a computer program product, including a computer program, when the computer program is executed by at least one processor, the information processing method as described in the first aspect and various possible designs of the first aspect are implemented.

One or more embodiments of the present disclosure provide an information processing method and device, in the method, firstly in response to detecting first change information that a three dimensional map is changed, the second change information of the anchor point is determined based on the first change information, where the anchor point is pre-associated with the first image frame of the three dimensional map; the pose of the anchor point is adjusted based on the second change information. According to one or more embodiments, when the three dimensional map is changed, the anchor point of the three dimensional map can change with the change of the first image frame with which the anchor point is associated, so that the display of the anchor point remains relatively stable, and the problem that the display of the anchor point is stagger when the three dimensional map is changed is avoided.

BRIEF DESCRIPTION OF DRAWINGS

To describe the technical solutions in embodiments of the present disclosure or in the existing art more clearly, in the following, the accompanying drawings needed for describing the embodiments or the existing art will be briefly introduced. Apparently, the accompanying drawings in the following description are some embodiments of the present disclosure, and persons of ordinary skill in the art may still derive other drawings from these accompanying drawings without paying creative effort.

DESCRIPTION OF EMBODIMENTS

To make the objectives, technical solutions, and advantages of embodiments of the present disclosure clearer, in the following, the technical solutions in the embodiments of the present disclosure will be clearly and comprehensively described with reference to the accompanying drawings of the embodiments of the present disclosure. Apparently, the described embodiments are merely a part rather than all embodiments of the present disclosure. All other embodiments obtained by persons of ordinary skill in the art based on the embodiments of the present disclosure without paying creative effort shall fall within the protection scope of the present disclosure.

In the existing art, an anchor point can be added with respect to a three dimensional map after the three dimensional map is built according to a scene image. When a user optimizes the three dimensional map, there would be a relative dislocation of the anchor point in the three dimensional map.

Figure 1:
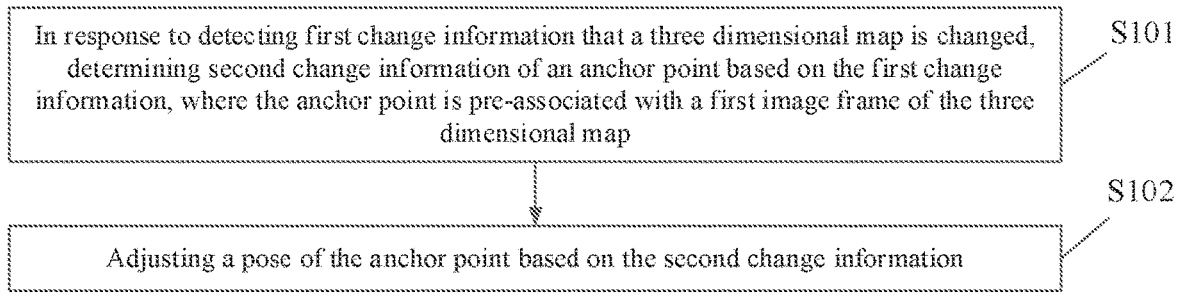
FIG. 1 is a first schematic flowchart of an information processing method provided by one or more embodiments of the present disclosure.

Referring to FIG. 1, which is a schematic flowchart of an information processing method provided by one or more embodiments of the present disclosure. The method in one or more embodiments can be applied to a terminal device or server, and the information processing method includes:

S101, in response to detecting first change information that a three dimensional map is changed, determining second change information of an anchor point based on the first change information, where the anchor point is pre-associated with a first image frame of the three dimensional map.

The three dimensional map can be reconstructed from multiple first image frames. The first image frames may include a plurality of two dimensional image frames for reconstructing the three dimensional map.

In some application scenarios, the above-mentioned three dimensional map can be reconstructed from multiple first image frames collected by an image collecting device carried by a wearable device. According to a collecting setting of the image collecting device carried by the wearable device, images from different angles in the same scene can be collected, multiple image frames of this scene are acquired, and at least one first image frame can be selected from the multiple image frames.

The first image frame can be a representative key image frame with higher image quality and better feature point information selected from multiple image frames of a same part.

Usually after the reconstruction of the three dimensional map, in order to improve the visual experience of the user, or to facilitate the user to roam in the three dimensional map, the anchor point can be added to the three dimensional map. The anchor point can correspond to a virtual object. The virtual object here can include an image and/or a graphic. The image here can be a two dimensional image or a three dimensional image. As a schematic illustration, the above image may be, for example, a two dimensional image of an animal or a three dimensional image of an animal. The above graphics can include a variety of regular or irregular graphics. As a schematic illustration, the above graphic may be, for example, an arrow graphic which is set at the anchor point in the three dimensional map for indicating a roaming path, to allow the user to roam in the three dimensional map.

In one or more embodiments of the present disclosure, the anchor point can be pre-associated with at least one first image frame in the three dimensional map.

In some application scenarios, the first change information includes map optimization information and/or adjustment information for a scene three dimensional map. For example, change information about a change in a level of details (LOD) scale, or change information about a change in a visible distance, etc.

When the above changes occur in the three dimensional map, pose change information of the first image frame can be determined according to the first change information of the three dimensional map. In other words, when the above changes occur in the three dimensional map, a position of the first image frame or a position of a key point of the first image frame that constitutes the three dimensional map will change. If a pose of the anchor point relative to the original three dimensional map remains unchanged, display of the anchor point will be stagger. In order to solve the problem of dislocation of the display of the anchor point caused by the fact that the pose of the anchor point relative to the map remains unchanged when the above changes occur in the three dimensional map, in one or more embodiments of the present disclosure, the anchor point can be pre-associated with the first image frame. When the first change information is detected, the pose change information of the first image frame can be determined according to the first change information. Since the anchor point is pre-associated with the related first image frame, when the pose of the first image frame changes due to the change in the three dimensional map, the second change information of the anchor point can be determined according to the above association. The second change information here includes position and posture information of the map for which the anchor point has been changed relatively obtained according to the pose change of the first image frame.

S102, adjusting a pose of the anchor point based on the second change information.

After determining the above second change information, the pose of the anchor point can be adjusted according to a position and a posture of the anchor point indicated in the second change information. For example, a position of the anchor point relative to the three dimensional map can be adjusted to the position indicated by the second change information, and a posture of the anchor point relative to the three dimensional map can be adjusted to the posture indicated by the second change information. The relative position of the anchor point relative to the first image frame associated with the anchor point can remain unchanged after the pose adjustment.

In one or more embodiments of the present disclosure, when the three dimensional map is changed, the anchor point of the three dimensional map can change with the change of the first image frame associated with the anchor point, so that the display of the anchor point will not be dislocated, and the relative accuracy of the display position of the anchor point is ensured.

In one or more embodiments, the first change information includes a third pose of the first image frame after the three dimensional map is changed. The above step S101 may include: acquiring an initial second pose of the first image frame in an anchor point coordinate system, where the initial second pose includes a pose of the first image frame in the anchor point coordinate system before the three dimensional map is changed; determining the second change information based on the initial second pose and the third pose.

In one or more embodiments, the pose of the anchor point relative to the three dimensional map can be associatively adjusted according to the third pose of the first image frame after the three dimensional map is changed, so that after the pose of the anchor point is adjusted, the pose of the first image frame in the coordinate system approaches the initial second pose.

Thus, when the three dimensional map is changed, the pose of the anchor point relative to the three dimensional map is adjusted according to the third pose of the first image frame associated with the anchor point after the three dimensional map is changed. So that the pose of the anchor point relative to the first image frame is kept relatively stable, thereby keeping the position of the anchor point in the three dimensional map relatively correct.

Figure 2:
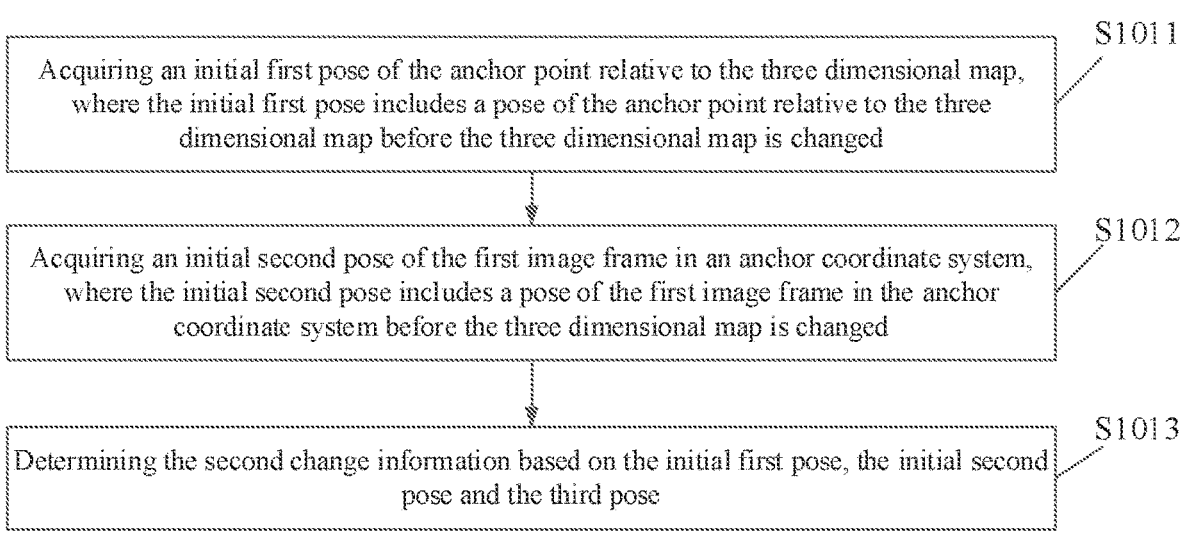
FIG. 2 is a flowchart of an exemplary implementation of step S101 as shown in FIG. 1.

In one or more embodiments, the first change information includes the third pose of the first image frame after the three dimensional map is changed. The above step S101 can include the following sub-steps as shown in FIG. 2:

sub-step S1011, acquiring an initial first pose of the anchor point relative to the three dimensional map, where the initial first pose includes a pose of the anchor point relative to the three dimensional map before the three dimensional map is changed.

It is possible to add the anchor point(s) to the three dimensional map after the three dimensional map is built with the first image frame. For each anchor point, information about the initial first pose of the anchor point relative to the three dimensional map can be recorded. In practice, the above information about the initial first pose of the anchor point relative to the three dimensional map can be stored.

When the change in the three dimensional map is detected, if it is determined that the pose of the anchor point needs to be adjusted, the initial first pose of the anchor point can be fetched from pre-stored information.

The initial first pose includes a position and a posture of the anchor point relative to the three dimensional map before the three dimensional map is changed. The position in the initial first pose includes the coordinate of the anchor point relative to the three dimensional map. The posture in the initial first pose includes a rotation angle, a pitch angle and a roll angle of the anchor point relative to the three dimensional map. It should be noted that the position covered by the present disclosure can include coordinates.

The pose of the anchor point relative to the three dimensional map can be expressed as $[R_{aw}, t_{aw}]$, where $R_{aw}$ is the coordinate of the anchor point relative to the three dimensional map, and $t_{aw}$ is the pose of the anchor point relative to the three dimensional map. In practice, $R_{aw}$ can be a matrix of 3×3, and $t_{aw}$ can be a matrix of 3×1.

Sub-step S1012, acquiring an initial second pose of the first image frame in an anchor coordinate system, where the initial second pose includes a pose of the first image frame in the anchor coordinate system before the three dimensional map is changed.

The initial second pose of the first image frame in the anchor coordinate system can be determined according to various conversion relationships between the images.

In one or more embodiments, the above sub-step S1012 may include: determining the initial second pose based on a pre-constructed first association among a first pose, a second pose and the third pose, and the initial first pose and an initial third pose, where the first pose is the pose of the anchor point relative to the three dimensional map, the second pose is the pose of the first image frame in the anchor point coordinate system, the third pose is a pose of the first image frame in the three dimensional map, the initial third pose is a pose of the first image frame in the three dimensional map before the three dimensional map is changed.

In one or more embodiments, the above first association can be expressed by the following formula:

$$p_{ac} = R_{aw} \times t_{wc} + t_{aw} \qquad (1)$$

$$R_{ac} = R_{aw} * R_{wc} \qquad (2)$$

where $P_{ac}$ is the coordinate of the first image frame in the anchor point coordinate system; $R_{ac}$ is the posture of the first image frame in the anchor point coordinate system; $t_{aw}$ is the coordinate of the anchor point in the initial first pose relative to the three dimensional map; $R_{aw}$ is the posture of the anchor point in the initial first pose relative in the three dimensional map; $t_{wc}$ is the coordinate of the first image frame in the initial third pose of the three dimensional map; and $R_{wc}$ is the pose of the first image frame in the initial third pose in the three dimensional map.

Sub-step S1013, determining the second change information based on the initial first pose, the initial second pose and the third pose.

After determining the third pose in the three dimensional map of the first image frame after the three dimensional map is changed, the second change information can be determined by using the third pose, the initial first pose and the initial second pose according to various methods. The second change information is used for indicating an adjusted pose of the anchor point relative to the changed three dimensional map.

In some alternative implementations, the above sub-step S1013 may include: determining the second change information based on a pre-constructed first association among a first pose, a second pose and the third pose, and the third pose of the first image frame after the three dimensional map is change, to make a second pose approach the initial second pose, the second pose here is determined based on the first association, a first pose indicated by the second change information, and the third pose after the three dimensional map is changed, where the first pose is the pose of the anchor point relative to the three dimensional map, the second pose is the pose of the first image frame in the anchor point coordinate system, and the third pose is the pose of the first image frame in the three dimensional map.

In practice, the following function $y_1$ can be pre-constructed:

$$y_1 = (P_{ac} - R'_{aw} \times t'_{wc} - t'_{aw})^2 + \log(R'_{aw} \times R'_{wc} \times R_{ac}^{-1})^2 \qquad (3);$$

where $P_{ac}$ and $R_{ac}$ can be the position and the posture in the initial second pose respectively, which can be specifically determined by the pre-constructed first association among the first pose, the second and the third pose; $t'_{wc}$ and $R'_{wc}$ are the position and posture in the third pose of the first image frame after the three dimensional map is changed respectively; $t'_{aw}$ and $R'_{aw}$ are the position and posture of the anchor point to be adjusted relative to the three dimensional map respectively.

The values of the $R'_{aw}$ and the $t'_{aw}$ above minimize the value of the function y1.

After the above function y1 obtains its minimum value, the adjusted pose of the anchor point which is indicated by the second change information and is relative to the changed three dimensional map is determined.

Figure 3:
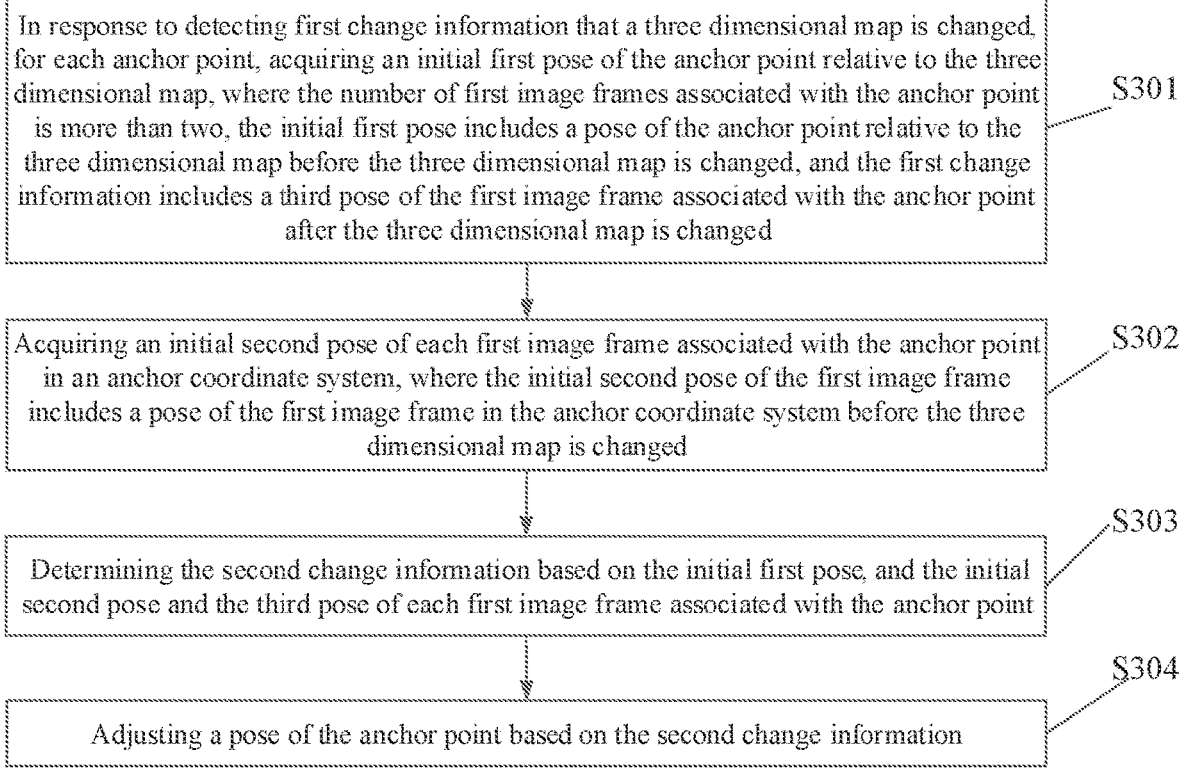
FIG. 3 is a second schematic flowchart of an information processing method provided by one or more embodiments of the present disclosure.

Referring to FIG. 3, which is a schematic flowchart of an information processing method provided by one or more embodiments of the present disclosure. The method in one or more embodiments can be applied to a terminal device or server, and the information processing method includes:

S301, in response to detecting first change information that a three dimensional map is changed, for each anchor point, acquiring an initial first pose of the anchor point relative to the three dimensional map, where the number of first image frames associated with the anchor point is more than two, the initial first pose includes a pose of the anchor point relative to the three dimensional map before the three dimensional map is changed, and the first change information includes a third pose of the first image frame associated with the anchor point after the three dimensional map is changed.

In one or more embodiments, the number of pre-set virtual objects in the three dimensional map may be more than two. Each virtual object can be set at a position of an anchor point.

After the three dimensional map is changed, since the pose of the first image frame for constructing the above three dimensional map may change, if the pose of each anchor does not change with respect to the map, a display of each anchor in the three dimensional map will be dislocated with the original setting in the three dimensional map. After the three dimensional map changes, it is necessary to adjust the pose of each anchor point so that the display of each anchor point is relatively stable with respect to the three dimensional map before the change. The display of the anchor point may include the display of a display content corresponding to the anchor point. The display content corresponding to the anchor point includes the graphic or image of the virtual object.

S302, acquiring an initial second pose of each first image frame associated with the anchor point in an anchor coordinate system, where the initial second pose of the first image frame includes a pose of the first image frame in the anchor coordinate system before the three dimensional map is changed.

Each anchor point can be associated with more than two first image frames.

Since the anchor point is associated with more than two first image frames, the change in the pose of each first image frame associated with the anchor point needs to be taken as a reference when determining the second change information.

For each anchor point, the initial second pose in the anchor coordinate system of each first image frame associated with the anchor point can be acquired.

Specifically, the initial second pose of each first image frame in the anchor coordinate system can be determined based on the pre-constructed association of the first pose, the second and the third pose, and the initial first pose and the initial third pose.

For each first image frame, the third pose is the pose of the first image frame in the three dimensional map; the initial third pose is the pose of the first image frame in the three dimensional map before the three dimensional map is changed.

For each first image frame associated with the anchor point, the above first association can be represented by the following formula:

$$p_{ac} = R_{aw} \times t_{wc} + t_{aw} \quad (1);$$

$$R_{ac} = R_{aw} * R_{wc} \quad (2);$$

where $P_{ac}$ is the position of the first image frame in the anchor point coordinate system; $R_{ac}$ is the posture of the first image frame in the anchor point coordinate system; $t_{aw}$ is the position of the anchor point in the initial first pose relative to the three dimensional map; $R_{aw}$ is the posture of the anchor point in the initial first pose relative in the three dimensional map; $t_{wc}$ is the position of the first image frame in the initial third pose of the three dimensional map; and $R_{wc}$ is the pose of the first image frame in the initial third pose in the three dimensional map.

S303, determining the second change information based on the initial first pose, and the initial second pose and the third pose of each first image frame associated with the anchor point.

Specifically, the above step S303 may include: determining the second change information based on a pre-constructed first association among a first pose, a second pose and the third pose, and the third pose of the first image frame after the three dimensional map is changed, to make a second pose approach the initial second pose, where the second pose here is determined based on the first association, a first pose indicated by the second change information, and the third pose after the three dimensional map is changed, where the first pose is the pose of the anchor point relative to the three dimensional map, the second pose is the pose of the first image frame in the anchor point coordinate system, and the third pose is the pose of the first image frame in the three dimensional map.

It can be assumed that the relative pose of the anchor point with respect to the first image frame associated with the anchor point is unchanged, that is, the initial second pose of each first image frame associated with the anchor point in the anchor coordinate system is assumed to remain unchanged. Due to the change of the three dimensional map, the pose of the first image frame changes, the pose of the anchor point can be adjusted according to the change information of the first image frame, so that the relative stability of the anchor point relative to the three dimensional map is maintained.

In one or more embodiments, the above-mentioned pre-constructed first association among the first pose, the second pose, and the third pose includes the first association among the first pose of the anchor point relative to the three dimensional map, the second pose of each first image frame associated with the anchor point in the anchor coordinate system and the third pose of each first image frame in the three dimensional map after the three dimensional image is changed.

As an implementation, the following function y2 can be expressed as:

$$y_2 = \Sigma_{i=1}^{M} W_i (p_{ac}^i - R'_{aw} * t'_{wc}^i - t'_{aw})^2 + W_i (\text{LOG}(R'_{aw} * R'_{wc}^i * R_{ac}^{i-1}))^2 \quad (4);$$

where M is the number of first image frames associated with the anchor point; $p_{ac}^i$ and $R_{ac}^i$ are a position and a posture of an i-th first image frame associated with the anchor point in the initial second pose respectively; $t'w_c^i$ and $R'w_c^i$ are a position and a posture of the i-th first image frame associated with the anchor point in the third pose after the three dimensional map is changed respectively; $t'_{aw}$ and $R'_{aw}$ are a position and a posture of the anchor point to be adjusted relative to the three dimensional map respectively, and they are optimizable variables; $W_i$ can be the number of feature points that meet a preset condition of the i-th first image frame associated with the anchor point, i is an integer that is greater than or equal to 1 and less than or equal to M.

By adjusting the values of $t'_{aw}$ and $R'_{aw}$, the values of the above function y2 are minimized, so that the relative pose of the anchor point relative to each first image frame associated with the anchor point is kept stable as far as possible.

After the above function y2 obtains its minimum value, it is possible to obtain the pose information indicating the adjustment that should be performed on the three dimensional map after the relative change of the anchor point, that is, the second change information mentioned above.

S304, adjusting a pose of the anchor point based on the second change information.

According to the information processing method provided in one or more embodiments, the pose(s) of the anchor point(s) associated with multiple first image frames can be adjusted as the three dimensional map changes, so that the display of the anchor point remains relatively stable before and after the three dimensional map is changed.

In some alternative implementations of the information processing method shown in FIG. 1 and FIG. 3, the first image frame associated with the anchor point can be determined based on the following steps.

Firstly, for the three dimensional map before it is changed, determining at least one first image frame within a preset range of the anchor point as a candidate first image frame.

In the alternative implementations, the three dimensional map can be reconstructed from multiple first image frames. The anchor point can be added to the reconstructed three dimensional map. The position of the anchor point in the three dimensional map can be determined. In the three dimensional map, at least one first image frame within the preset range of the anchor point is determined as the candidate first image frame. The preset range can be, for example, a distance to the anchor point being within a first preset distance. That is, the first image frame with a distance to the anchor point being within the first preset distance is determined as the candidate first image frame. The first preset distance can be set according to specific application scenarios, which is not limited herein. In some application scenarios, the above first preset distance can be 10 meters, 5 meters, etc.

Secondly, determining, according to a relationship between a position of a projection point for a three dimensional coordinate of a feature point in a respective first image frame and a position of the feature point in a respective candidate first image frame, the first image frame associated with the anchor point from the candidate first image frame.

The feature point in the three dimensional map (the three dimensional coordinate of the feature point in the first image frame) can be projected onto each candidate first image frame. The feature point of the first image frame can be a point in the image with drastic change in a gray value or a point on an edge of the image with large curvature. For the specific way to project the feature point in the three dimensional map to the candidate first image frame, reference can be made to the existing method of projecting from the three dimensional map to a two dimensional image, which is not discussed here.

In one or more embodiments, according to a relationship between the position of a projection point in each first image frame of a feature point in a three dimensional coordinate and the position of the feature point in each candidate first image frame, determining the first image frame associated with the anchor point from the candidate first image frame, including the following steps:

firstly, for each candidate first image frame, determining the number of feature points of the candidate first image frame that meet a preset condition, where the preset condition includes: a distance between a position of a projection point for a three dimensional coordinate of a feature point of the candidate first image frame towards the candidate first image frame and a position of the feature point in the candidate first image frame being less than a second preset distance;

secondly, determining, according to the number of feature points that meet the preset condition corresponding to the respective candidate first image frame, the first image associated with the anchor point from multiple candidate first image frames.

The second preset distance can be, for example, 5 pixels, 2 pixels, etc. The second preset distance can be set according to the specific application scenario, which is not limited here.

If there are multiple feature points that meet the preset condition in a candidate first image frame, then recording the number of the multiple feature points which meet the preset condition. Besides, associating and storing the candidate first image frame and the number of the feature points in the candidate first image frame which meet the preset condition.

In some application scenarios, the multiple candidate first image frames can be sorted in the order from most to least according to the above recorded number, and then multiple candidate first image frames whose sort numbers are less than a preset sequence number threshold are taken as the first image frames associated with the anchor point.

In some other application scenarios, the candidate first image frame whose corresponding number is greater than a preset number threshold can be used as the first image frame associated with the anchor point.

In the alternative implementations, the first image frame associated with the anchor point can be determined more accurately by using the above methods, so as to improve the accuracy of the result obtained by using the information processing method shown in FIG. 1 or FIG. 3 to adjust the pose of the anchor point.

Figure 4:
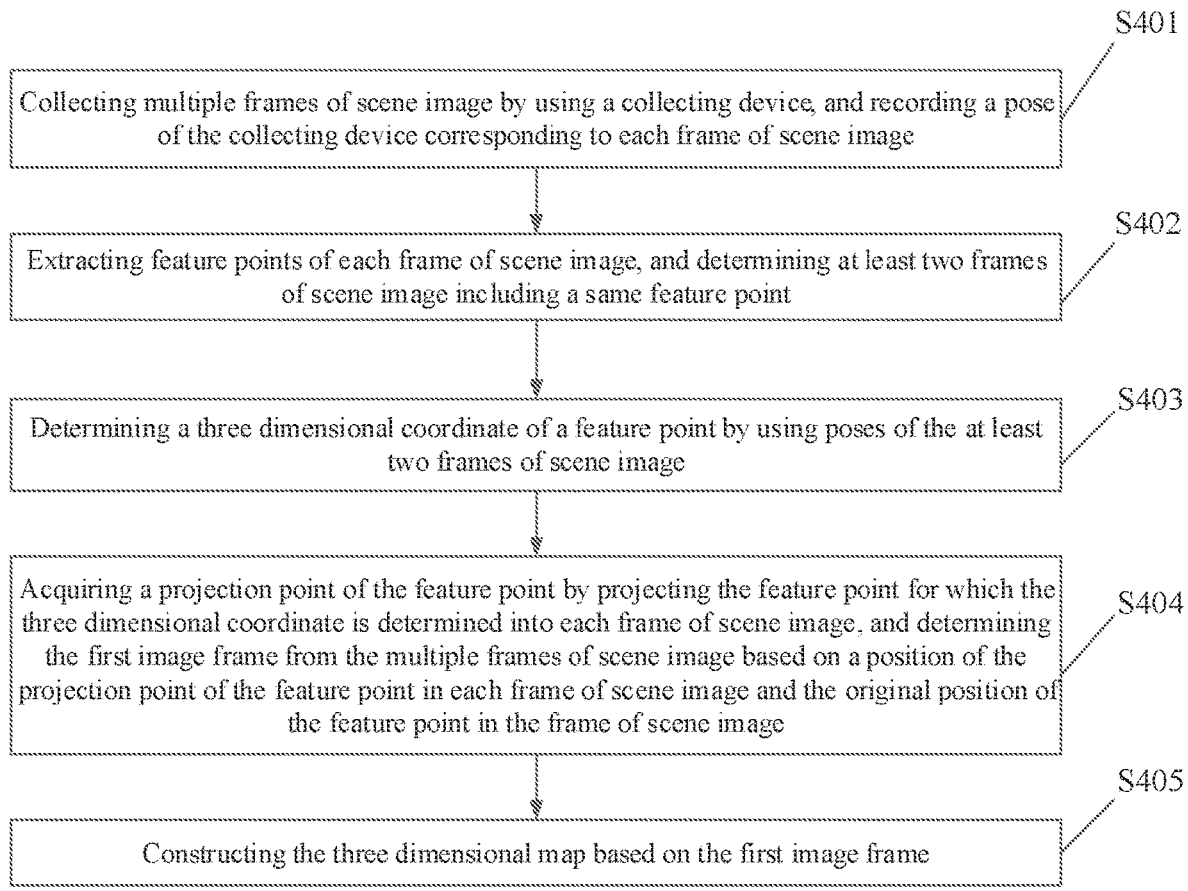
FIG. 4 is a schematic of steps for generating a three dimensional map provided by one or more embodiments of the present disclosure.

The information processing method provided in the present disclosure also includes a process for generating the three dimensional map as shown in FIG. 4:

S401, collecting multiple frames of scene image by using a collecting device, and recording a pose of the collecting device corresponding to each frame of scene image.

The collecting device can be a wearable device. Specifically, an image collecting device can be integrated into the wearable device. The multiple frames of scene image can be collected by the image collecting device.

In some application scenarios, the above multiple image collecting devices can be set in the wearable device, and each image collecting device is responsible for collecting the scene image(s) within a preset range. The multiple image collecting devices can collect scene images within a preset angle range. For example, the preset angle can be 360°.

In the application scenarios, each image collecting device can correspond to a pose of a preset collecting device. The pose of the collecting device can be a pose relative to a world coordinate system.

In some application scenarios, a small number of image collecting devices can be set in the above wearable device to collect scene images within the preset angle range by rotating the wearable device.

Taking the number of the image collecting device of the wearable device being one as an example, the image collecting device takes the scene image by virtue of rotation. It is possible to determine the pose of the image collecting device in the world coordinate system when taking each frame of scene image.

The scene image here can be an indoor scene image or an outdoor scene image.

S402, extracting feature points of each frame of scene image, and determining at least two frames of scene image including a same feature point.

Extracting the feature points of each frame of scene image according to various image feature point extracting methods.

In one or more embodiments, the wearable device can be integrated with a feature point extraction algorithm. After the wearable device collects the above multiple frames of scene image, it is possible to use the integrated feature point extraction algorithm for extracting the feature points of each frame of scene image.

It possible to match at least two frames of scene image collected on adjacent collecting poses, and determining the same feature point(s). It possible to determine the same feature point(s) in the at least two frames of scene image according to relevant methods for determining the same feature point(s).

S403, determining a three dimensional coordinate of a feature point by using poses of the at least two frames of scene image.

After determining the same feature point(s) corresponding to the at least two frames of scene image, since the collecting pose corresponding to each frame of scene image is known, the three dimensional coordinate(s) of the same feature point(s) can be calculated by using a triangulation method. The above triangulation method, for example, can use various triangulation algorithms such as linear triangulation, geometry, etc.

S404, acquiring a projection point of the feature point by projecting the feature point for which the three dimensional coordinate is determined into each frame of scene image, and determining the first image frame from the multiple frames of scene image based on a position of the projection point of the feature point in each frame of scene image and the original position of the feature point in the frame of scene image.

The three dimensional coordinate of the feature point can be re-projected into each frame of scene image by using various projection methods, and the projection point of the three dimensional coordinate can be acquired from the multiple frames of scene image.

In some application scenarios, the following formula can be used for determining the projection point of the feature point in the scene image:

$$p_{uv} = \frac{1}{\lambda} K \times (R \times p_w + t); \quad (5)$$

λ is a depth of the three dimensional coordinate of the feature point; K is an internal parameter matrix of a camera; t is a position of the image collecting device in the world coordinate system when this frame of scene image is collected; R is a posture of the image collecting device in the world coordinate system when this frame of scene image is collected; $p_w$ is the three dimensional coordinate of the feature point in the world coordinate system, and $p_{uv}$ is a pixel coordinate of the projection point of the feature point projected to this frame of scene image.

For each frame of scene image, determining whether the position of the projection point for projecting the three dimensional coordinate of each feature point in the scene image and the original position of the feature point in the scene image meet a preset condition, where the preset condition can be, for example, a distance between the projection for projecting the three dimensional coordinate of the feature point in the scene image and the position of the feature point in the scene image being less than a third preset distance. The third preset distance can be, for example, 5 pixels, 2 pixels, etc. The third preset distance can be set according to the specific application scenarios, which is not limited here.

If there are multiple feature points that meet the preset condition in one frame of scene image, then recording the number of the multiple feature points which meet the preset condition.

In some application scenarios, for each shooting pose, determining the first image frame corresponding to the shooting pose from multiple frames of scene image corresponding to the shooting pose according to the number of feature points which meet the preset condition.

In some application scenarios, for multiple scene images corresponding to multiple shooting poses respectively, determining the first image frame from the multiple scene images according to the number of feature points which meet the preset condition.

Specifically, in the above two kinds of scenarios, the multiple scene image frames can be sorted in order from most to least according to the number of feature points which meet the above preset condition. The frame of scene image whose sort number is less than a preset threshold is selected as the first image frame.

Or, in the above two kinds of scenarios, the frame of scene image whose number of feature points that meet the above preset condition is greater than the preset number threshold is taken as the first image frame.

The first image frame and the number of feature points which meet the preset condition corresponding to the first image frame can be associated and stored.

By re-projecting the three dimensional coordinate of the feature point into the scene image, it can be checked whether there are feature points misidentified as the same feature point in the original different image scenes. If there are many misidentified feature points in the scene image, the scene image will not be used as the first image frame to construct the three dimensional map in the method.

S405, constructing the three dimensional map based on the first image frame.

A three dimensional image reconstruction method related to the reconstruction of a three dimensional image from a two dimensional image can be used for constructing the three dimensional map from the first image frame.

In the three dimensional map constructing method provided in one or more embodiments, the projection point is acquired by projecting the three dimensional coordinate of the feature point of the scene image into the scene image frame, to determine the first image frame from multiple scene images, and construct the three dimensional map from the first image frame. Since the image frame including multiple misidentified feature points is removed from the image in the constructed three dimensional map by using the position relationship between the above projection point and the original position of the feature point in the scene image frame, so the three dimensional map constructed from the first image frame is more suitable to the original scene. The accuracy of the first image frame associated with the anchor point is further improved.

Some application scenarios of the information processing method are described below. A wearable AR device is used in these application scenarios, such as a head-mounted AR device. The head-mounted AR device can be integrated with an image collecting device and a three dimensional map display device.

The image collecting device in the head-mounted AR device can collect scene images in a 360 degree range. The collected scene image is processed according to the method shown in FIG. 4, acquiring a first image frame, and reconstructing the three dimensional map according to the first image frame.

In some application scenarios, the collected scene image can be processed by the head-mounted AR device according to the method shown in FIG. 3, acquiring the first image frame, and reconstructing the three dimensional according to the first image frame.

In some other application scenarios, the collected scene image can be sent by the head-mounted AR device to an electronic device with an image processing capability, where the electronic device is in a communicating connection with the head-mounted AR device, the electronic device processes the collected scene image according to the method shown in FIG. 4, acquiring the first image frame, and reconstructing the three dimensional according to the first image frame.

After the above three dimensional map is obtained, the anchor point can be added to the three dimensional map according to the application scenario. Besides, a virtual object can be associated with the anchor point. In this way, when the three dimensional map is presented to a user, the user can see the above virtual object in the display image of the three dimensional map, visual effects for the user are further improved.

A three dimensional map with an added anchor point can be presented by a wearable device. In particular, the above three dimensional map with the added anchor point can be displayed by a display device integrated with the wearable device.

In order that the relative position of the anchor point in the three dimensional map does not change before and after the three dimensional map is changed, when adding the anchor point to the three dimensional map, the first image frame associated with the anchor point can be determined according to the above steps of determining the first image frame associated with the anchor point.

In some cases, a user can optimize the three dimensional map, such as updating the first image frame of the three dimensional map, i.e., the three dimensional map is changed. According to one or more embodiments shown in FIG. 1 or FIG. 2, determining the second change information corresponding to the anchor point, and adjusting the pose of the anchor point after the three dimensional map is changed according to the second change information.

In these application scenarios, before and after the three dimensional map which is presented in the wearable device is changed, the relative position of the anchor point added to the three dimensional map remains stable, it is helpful to maintain the consistency of the user's visual experience.

Figure 5:
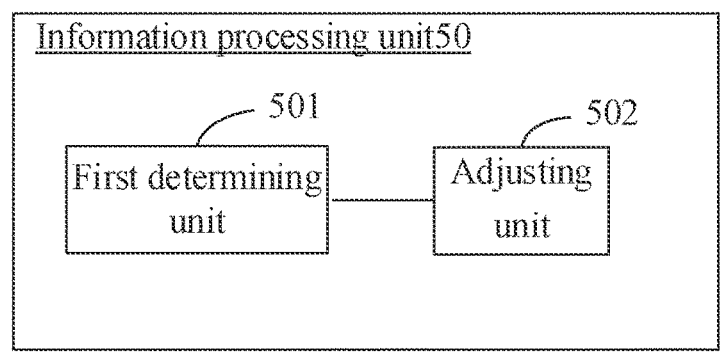
FIG. 5 is a structural block diagram of an information processing device provided by one or more embodiments of the present disclosure.

Corresponding to the information processing method of the above embodiments, FIG. 5 is a structural block diagram of an information processing device provided in the present disclosure. For illustrative purposes, only the portions relevant to one or more embodiments of the present disclosure are shown. Referring to FIG. 5, the device 50 includes a first determining unit 501 and an adjusting unit 502; where, the first determining unit 501, configured to: in response to first change information that a three dimensional map is changed, determine second change information of an anchor point based on the first change information, where the anchor point is pre-associated with a first image frame of the three dimensional map;

the adjusting unit 502, configured to adjust a pose of the anchor point based on the second change information.

In one or more embodiments of the present disclosure, the first change information includes a third pose of the first image frame after the three dimensional map is changed; the first determining unit 501 is specifically configured to: acquire an initial second pose of the first image frame in an anchor point coordinate system, where the initial second pose includes a pose of the first image frame in the anchor point coordinate system before the three dimensional map is changed; and determine the second change information based on the initial second pose and the third pose.

In one or more embodiments of the present disclosure, the first change information includes a third pose of the first image frame after the three dimensional map is changed; the first determining unit 501 is specifically configured to: acquire an initial first pose of the anchor point relative to the three dimensional map, where the initial first pose includes a pose of the anchor point relative to the three dimensional map before the three dimensional map is changed; acquire an initial second pose of the first image frame in an anchor coordinate system, where the initial second pose includes a pose of the first image frame in the anchor coordinate system before the three dimensional map is changed; and determine the second change information based on the initial first pose, the initial second pose and the third pose.

In one or more embodiments of the present disclosure, the first determining unit 501 is specifically configured to: determine the initial second pose based on a pre-constructed first association among a first pose, a second pose and the third pose, and the initial first pose and an initial third pose; where the first pose is the pose of the anchor point relative to the three dimensional map, the second pose is the pose of the first image frame in the anchor point coordinate system, the third pose is a pose of the first image frame in the three dimensional map, and the initial third pose is a pose of the first image frame in the three dimensional map before the three dimensional map is changed.

In one or more embodiments of the present disclosure, where the number of first image frames associated with the anchor point is more than two, the first change information includes a third pose of each first image frame associated with the anchor point after the three dimensional map is changed; the first determining unit 501 is specifically configured to: for each anchor point, acquire an initial first pose of the anchor point relative to the three dimensional map, where the initial first pose includes a pose of the anchor point relative to the three dimensional map before the three dimensional map is changed; acquiring an initial second pose of each first image frame associated with the anchor point in an anchor coordinate system, where the initial second pose of the first image frame includes a pose of the first image frame in the anchor coordinate system before the three dimensional map is changed; and determine the second change information based on the initial first pose, and the initial second pose and the third pose of each first image frame associated with the anchor point.

In one or more embodiments of the present disclosure, the first determining unit 501 is specifically configured to: determine the second change information based on a pre-constructed first association among a first pose, a second pose and the third pose, and the third pose of the first image frame after the three dimensional map is change, to make a second pose, which is determined based on the first association, a first pose indicated by the second change information, and the third pose after the three dimensional map is changed, approach the initial second pose.

In one or more embodiments of the present disclosure, the apparatus further includes a second determining unit (not shown in the drawings), the second determining unit is configured to determine the first image frame associated with the anchor point according to the following steps: for the three dimensional map before being changed, determining at least one first image frame within a preset range of the anchor point as a candidate first image frame; and determining, according to a relationship between a position of a projection point for a three dimensional coordinate of a feature point in a respective first image frame and a position of the feature point in a respective candidate first image frame, the first image frame associated with the anchor point from the candidate first image frame.

In one or more embodiments of the present disclosure, the second determining unit is specifically configured to: for each candidate first image frame, determine the number of feature points of the candidate first image frame that meet a preset condition, where the preset condition includes: a distance between a position of a projection point for a three dimensional coordinate of a feature point of the candidate first image frame towards the candidate first image frame and a position of the feature point in the candidate first image frame being less than a second preset distance; and determine, according to the number of feature points that meet the preset condition corresponding to the respective candidate first image frame, the first image associated with the anchor point from multiple candidate first image frames.

In one or more embodiments of the present disclosure, the apparatus further includes a map generating unit (not shown in the drawings), the map generating unit is configured to generate the three dimensional map according to the following steps: collecting multiple frames of scene image by using a collecting device, and recording a pose of the collecting device corresponding to each frame of scene image; extracting feature points of each frame of scene image, and determining at least two frames of scene image comprising a same feature point; determining a three dimensional coordinate of a feature point by using poses of the at least two frames of scene image; acquiring a projection point of the feature point by projecting the feature point for which the three dimensional coordinate is determined into each frame of scene image, and determining the first image frame from the multiple frames of scene image based on a position of the projection point of the feature point in each frame of scene image and an original position of the feature point in the frame of scene image; constructing the three dimensional map based on the first image frame.

In one or more embodiments of the present disclosure, the three dimensional map is constructed from the first image frame of an image collected by a wearable device, and presented by the wearable device.

In order to implement the above embodiment, there is provided an electronic device in embodiments of the present disclosure.

Figure 6:
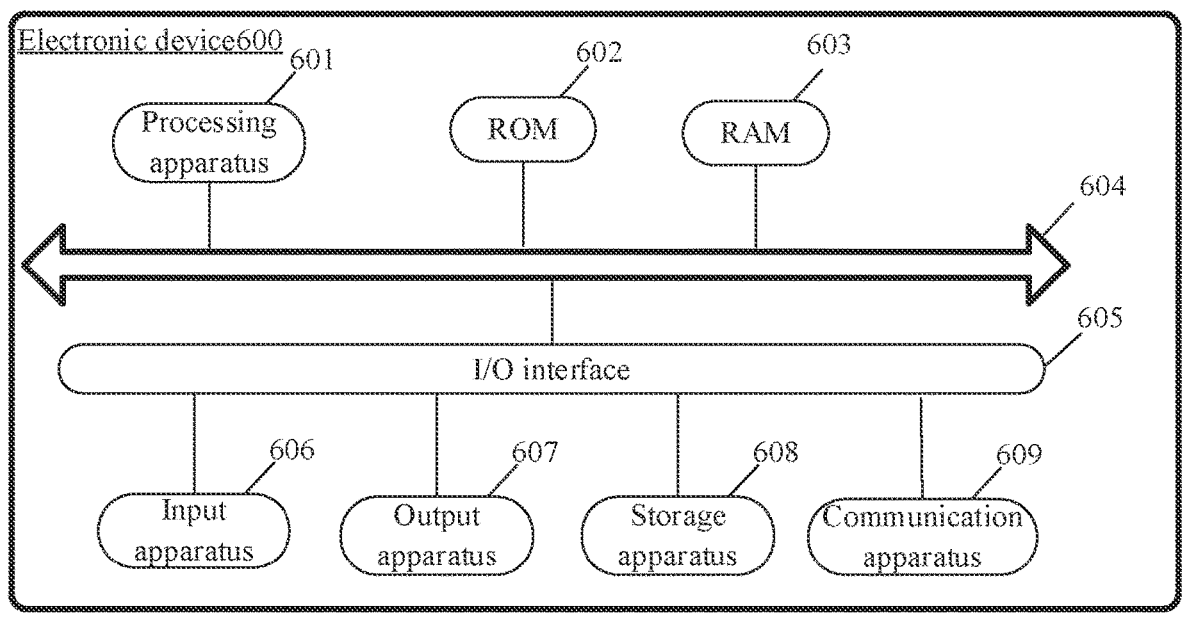
FIG. 6 is a hardware structural diagram of an information processing device provided by one or more embodiments of the present disclosure.

Referring to FIG. 6, which shows a schematic structural diagram of an electronic device 600 suitable for implementing embodiments of the present disclosure, the electronic device 600 can be a head-mounted AR device, a terminal device, or a server. Where the terminal device can be, but is not limited to a mobile terminal such as a mobile phone, a notebook computer, a digital broadcast receiver, a personal digital assistant (PDA for short), a portable Android device (PAD for short), a portable multimedia player (PMP for short), an in-vehicle terminal (such as in-vehicle navigation terminals) and the like, and a stationary terminal such as a digital TV, a desktop computer and the like. The electronic device shown in FIG. 6 is only an example and should not impose any limitations on functions and usable scopes of the embodiments of the present disclosure.

As shown in FIG. 6, the electronic device 600 can include a processing apparatus (for example, a central processing unit, a graphics processor and so on) 601, which may execute various appropriate actions and processes based on a program stored in a read-only memory (ROM for short) 602 or a program loaded into a random access memory (RAM for short) 603 from a storage apparatus 608. In the RAM 603, various programs and data necessary for operations of the electronic device 600 are also stored. The processing apparatus 601, the ROM 602 and the RAM 603 are connected to each other through a bus 604. An input/output (I/O for short) interface 605 is also connected to the bus 604.

Typically, the following apparatus can be connected to the I/O interface 605: an input apparatus 606 including, for example, a touch screen, a touchpad, a keyboard, a mouse, a camera, a microphone, an accelerometer, a gyroscope and the like; an output apparatus 607 including, for example, a liquid crystal display (LCD for short), a speaker, a vibrator and the like; a storage apparatus 608, including, for example, a magnetic tape, a hard disk and the like; and a communication apparatus 609. The communication apparatus 609 may allow the electronic device 600 to communicate wirelessly or through wires with other devices to exchange data. While FIG. 6 shows the electronic device 600 having various apparatus, it should be understood that not all of the illustrated apparatus are required to be implemented or provided. More or fewer apparatus may alternatively be implemented or provided.

In particular, according to one or more embodiments of the present disclosure, the processes described above with reference to the flowcharts may be implemented as computer software programs. For example, an embodiment of the present disclosure includes a computer program product, which includes a computer program carried on a computer-readable medium, the computer program contains program codes for performing the method illustrated in the flowchart. In such an embodiment, the computer program may be downloaded and installed from the network via the communication apparatus 609, or installed from the storage apparatus 608, or installed from the ROM 602. When the computer program is executed by the processing apparatus 601, the above functions defined in the method of one or more embodiments of the present disclosure are executed.

It should be noted that, the computer-readable medium described in the embodiments of the present disclosure may be a computer-readable signal medium or a computer-readable storage medium, or any combination of the above two. The computer-readable storage medium can be, for example, but not limited to, an electrical, magnetic, optical, electromagnetic, infrared or semiconductor system, apparatus or device, or the combination of any of the above. an electrical connection having one or more leads, a portable computer diskette, a hard disk, a random access memory (RAM), a read only memory (ROM), an erasable programmable read only memory (EPROM or flash memory), an optical fiber, a portable compact disc read only memory (CD-ROM), an optical storage apparatus, a magnetic storage apparatus, or any suitable combination thereof. In the present disclosure, the computer-readable storage medium may be any tangible medium that can contain or store a program. The program can be used by or in connection with an instruction execution system, apparatus, or component. While in the present disclosure, the computer-readable signal medium may include a data signal in baseband or propagated as part of a carrier wave, which carries computer-readable program codes. Such propagated data signal may take a variety of forms, including but not limited to an electromagnetic signal, an optical signal or any suitable combination of the above. The computer-readable signal medium can also be any computer-readable medium other than the computer-readable storage medium, and the computer-readable signal medium can transmit, propagate or transport the program for use by or in conjunction with the instruction execution system, apparatus or device. The program code contained on the computer-readable medium may be transmitted by any suitable medium, including but not limited to: an electric wire, an optical fiber cable, a radio frequency and the like, or any suitable combination of the above.

The computer readable medium mentioned above can be included in the electronic device mentioned above; or it can also exist separately without being assembled into the electronic device.

The computer readable medium mentioned above carries one or more programs, when the one or more programs executed by the electronic device, the electronic device is caused to execute the method shown in the above embodiment.

Computer program codes for performing the operations of the embodiments of the present disclosure may be written in one or more programming languages, the programming languages include object-oriented programming languages-such as Java, Smalltalk, C++, and also include conventional procedural programming languages-such as the "C" language or similar programming languages. The program code may be executed entirely on a user's computer, partly on the user's computer, as a stand-alone software package, partly on the user's computer and partly on a remote computer, or entirely on the remote computer or a server. In a case where the remote computer is involved, the remote computer may be connected to the user's computer through any kind of networks, including a local area network (LAN for short) or a wide area network (WAN for short), or may be connected to an external computer (for example, connected via the Internet through an Internet service provider).

Flowcharts and block diagrams in the accompanying drawings illustrate an architecture, a functionality and an operation of possible implementations of systems, methods and computer program products according to various embodiments of the present disclosure. In this regard, each block in the flowchart or block diagrams may represent a module, a code segment or a part of the code, the module, code segment or part of the code contains one or more executable instructions used to implement specified logical functions. It should also be noted that, in some alternative implementations, the functions noted in the blocks may occur in an order different from those noted in the accompanying drawings. For example, two blocks shown in succession may, in fact, be executed substantially concurrently, or sometimes be executed in a reverse order, depending upon the functionality involved. It should also be noted that, each block of the block diagrams and/or flowcharts, and combinations of blocks in the block diagrams and/or flowcharts can be implemented in dedicated hardware-based systems that perform the specified functions or operations, or can be implemented in a combination of dedicated hardware and computer instructions.

Units involved in one or more embodiments of the present disclosure may be implemented in a software manner, and may also be implemented in a hardware manner. Where, the name of the unit does not constitute a limitation for the unit per se under certain circumstances. For example, an adjusting unit can also be described as "a unit that adjusts a pose of an anchor point based on second change information".

The functions described above herein can be at least partially executed by one or more hardware logic components. For example, non-limitation available examples of the hardware logic components include: a field programmable gate array (FPGA), an application specific integrated circuit (ASIC), an application specific standard part (ASSP), a system on chip (SOC), a complex programmable logic device (CPLD) and the like.

In the context of this disclosure, a machine readable medium can be a tangible medium that can contain or store programs for use by or in combination with instruction execution systems, apparatus, or devices. The machine readable medium can be a machine readable signal medium or a machine readable storage medium. The machine readable medium may include but are not limited to an electronic, magnetic, optical, electromagnetic, infrared or semiconductor system, apparatus or device, or any suitable combination of the above. More specific examples of the machine readable storage medium may include an electrical connection based on one or more wires, a portable computer disk, a hard drive, a random access memory (RAM), a read-only memory (ROM), an erasable programmable read-only memory (EPROM or flash memory), an optical fiber, a compact disc read-only memory (CD-ROM), an optical storage device, a magnetic storage device, or any suitable combination of the above.

As a first aspect, according to one or more embodiments in the present disclosure, there is provided an image processing method, including:

in response to detecting first change information that a three dimensional map is changed, determining second change information of an anchor point based on the first change information, the anchor point being pre-associated with a first image frame of the three dimensional map;

adjusting a pose of the anchor point based on the second change information.

According to one or more embodiments in the present disclosure, the first change information includes a third pose of the first image frame after the three dimensional map is changed; where in response to detecting the first change information that the three dimensional map is changed, determining the second change information of the anchor point based on the first change information, includes:

acquiring an initial second pose of the first image frame in an anchor point coordinate system, where the initial second pose includes a pose of the first image frame in the anchor point coordinate system before the three dimensional map is changed;

determining the second change information based on the initial second pose and the third pose.

According to one or more embodiments in the present disclosure, the first change information includes a third pose of the first image frame after the three dimensional map is changed; where in response to detecting the first change information that the three dimensional map is changed, determining the second change information of the anchor point based on the first change information, includes:

acquiring an initial first pose of the anchor point relative to the three dimensional map, where the initial first pose includes a pose of the anchor point relative to the three dimensional map before the three dimensional map is changed;

acquiring an initial second pose of the first image frame in an anchor coordinate system, where the initial second pose includes a pose of the first image frame in the anchor coordinate system before the three dimensional map is changed; and determining the second change information based on the initial first pose, the initial second pose and the third pose.

According to one or more embodiments in the present disclosure, where acquiring the initial second pose of the first image frame in the anchor coordinate system, includes:
  determining the initial second pose based on a pre-constructed first association among a first pose, a second pose and the third pose, and the initial first pose and an initial third pose;
  where the first pose is the pose of the anchor point relative to the three dimensional map, the second pose is the pose of the first image frame in the anchor point coordinate system, the third pose is a pose of the first image frame in the three dimensional map, and the initial third pose is a pose of the first image frame in the three dimensional map before the three dimensional map is changed.

According to one or more embodiments in the present disclosure, where the number of first image frames associated with the anchor point is more than two, the first change information includes a third pose of each first image frame associated with the anchor point after the three dimensional map is changed; where in response to detecting first change information that a three dimensional map is changed, determining the second change information of the anchor point based on the first change information, includes:
  for each anchor point, acquiring an initial first pose of the anchor point relative to the three dimensional map, wherein the initial first pose comprises a pose of the anchor point relative to the three dimensional map before the three dimensional map is changed;
  acquiring an initial second pose of each first image frame associated with the anchor point in an anchor coordinate system, wherein the initial second pose of the first image frame comprises a pose of the first image frame in the anchor coordinate system before the three dimensional map is changed;
  determining the second change information based on the initial first pose, and the initial second pose and the third pose of each first image frame associated with the anchor point.

According to one or more embodiments in the present disclosure, where determining the second change information based on the initial first pose, and the initial second pose and the third pose of each first image frame associated with the anchor point, includes:
  determining the second change information based on a pre-constructed first association among a first pose, a second pose and the third pose, and the third pose of the first image frame after the three dimensional map is change, to make a second pose, which is determined based on the first association, a first pose indicated by the second change information, and the third pose after the three dimensional map is changed, approach the initial second pose;
  where the first pose is the pose of the anchor point relative to the three dimensional map, the second pose is the pose of the first image frame in the anchor point coordinate system, and the third pose is the pose of the first image frame in the three dimensional map.

According to one or more embodiments in the present disclosure, where the first image frame associated with the anchor point is determined based on the following steps:
  for the three dimensional map before being changed, determining at least one first image frame within a preset range of the anchor point as a candidate first image frame; and
  determining, according to a relationship between a position of a projection point for a three dimensional coordinate of a feature point in a respective first image frame and a position of the feature point in a respective candidate first image frame, the first image frame associated with the anchor point from the candidate first image frame.

According to one or more embodiments in the present disclosure, where determining, according to the relationship between the position of the projection point for the three dimensional coordinate of the feature point in the respective first image frame and the position of the feature point in the respective candidate first image frame, the first image frame associated with the anchor point from the candidate first image frame, includes:
  for each candidate first image frame, determining a number of feature points of the candidate first image frame that meet a preset condition, wherein the preset condition comprises: a distance between a position of a projection point for a three dimensional coordinate of a feature point of the candidate first image frame towards the candidate first image frame and a position of the feature point in the candidate first image frame being less than a second preset distance;
  determining, according to the number of feature points that meet the preset condition corresponding to the respective candidate first image frame, the first image associated with the anchor point from multiple candidate first image frames.

According to one or more embodiments in the present disclosure, where the method further includes a step of generating the three dimensional map:
  collecting multiple frames of scene image by using a collecting device, and recording a pose of the collecting device corresponding to each frame of scene image;
  extracting feature points of each frame of scene image, and determining at least two frames of scene image comprising a same feature point;
  determining a three dimensional coordinate of a feature point by using poses of the at least two frames of scene image;
  acquiring a projection point of the feature point by projecting the feature point for which the three dimensional coordinate is determined into each frame of scene image, and determining the first image frame from the multiple frames of scene image based on a position of the projection point of the feature point in each frame of scene image and an original position of the feature point in the frame of scene image;
  constructing the three dimensional map based on the first image frame.

According to one or more embodiments in the present disclosure, the three dimensional map is constructed from the first image frame of an image collected by a wearable device, and presented by the wearable device.

As a second aspect, according to one or more embodiments in the present disclosure, there is provided an image processing apparatus, including:
  a first determining unit, configured to: in response to first change information that a three dimensional map is changed, determine second change information of an anchor point based on the first change information, where the anchor point is pre-associated with a first image frame of the three dimensional map;

an adjusting unit, configured to adjust a pose of the anchor point based on the second change information.

According to one or more embodiments in the present disclosure, the first change information includes a third pose of the first image frame after the three dimensional map is changed; the first determining unit is specifically configured to: acquire an initial second pose of the first image frame in an anchor point coordinate system, where the initial second pose includes a pose of the first image frame in the anchor point coordinate system before the three dimensional map is changed; and determine the second change information based on the initial second pose and the third pose.

According to one or more embodiments in the present disclosure, the first change information includes a third pose of the first image frame after the three dimensional map is changed; the first determining unit is specifically configured to: acquire an initial first pose of the anchor point relative to the three dimensional map, where the initial first pose includes a pose of the anchor point relative to the three dimensional map before the three dimensional map is changed; acquire an initial second pose of the first image frame in an anchor coordinate system, where the initial second pose includes a pose of the first image frame in the anchor coordinate system before the three dimensional map is changed; and determine the second change information based on the initial first pose, the initial second pose and the third pose.

According to one or more embodiments in the present disclosure, the first determining unit is specifically configured to: determine the initial second pose based on a pre-constructed first association among a first pose, a second pose and the third pose, and the initial first pose and an initial third pose; where the first pose is the pose of the anchor point relative to the three dimensional map, the second pose is the pose of the first image frame in the anchor point coordinate system, the third pose is a pose of the first image frame in the three dimensional map, and the initial third pose is a pose of the first image frame in the three dimensional map before the three dimensional map is changed.

According to one or more embodiments in the present disclosure, where the number of first image frames associated with the anchor point is more than two, the first change information includes a third pose of each first image frame associated with the anchor point after the three dimensional map is changed; the first determining unit is specifically configured to: for each anchor point, acquire an initial first pose of the anchor point relative to the three dimensional map, where the initial first pose includes a pose of the anchor point relative to the three dimensional map before the three dimensional map is changed; acquiring an initial second pose of each first image frame associated with the anchor point in an anchor coordinate system, where the initial second pose of the first image frame includes a pose of the first image frame in the anchor coordinate system before the three dimensional map is changed; and determine the second change information based on the initial first pose, and the initial second pose and the third pose of each first image frame associated with the anchor point.

According to one or more embodiments in the present disclosure, the first determining unit is specifically configured to: determine the second change information based on a pre-constructed first association among a first pose, a second pose and the third pose, and the third pose of the first image frame after the three dimensional map is change, to make a second pose, which is determined based on the first association, a first pose indicated by the second change information, and the third pose after the three dimensional map is changed, approach the initial second pose.

According to one or more embodiments in the present disclosure, the apparatus further includes a second determining unit, the second determining unit is configured to determine the first image frame associated with the anchor point according to the following steps: for the three dimensional map before being changed, determining at least one first image frame within a preset range of the anchor point as a candidate first image frame; and determining, according to a relationship between a position of a projection point for a three dimensional coordinate of a feature point in a respective first image frame and a position of the feature point in a respective candidate first image frame, the first image frame associated with the anchor point from the candidate first image frame.

According to one or more embodiments in the present disclosure, the second determining unit is specifically configured to: for each candidate first image frame, determine the number of feature points of the candidate first image frame that meet a preset condition, where the preset condition includes: a distance between a position of a projection point for a three dimensional coordinate of a feature point of the candidate first image frame towards the candidate first image frame and a position of the feature point in the candidate first image frame being less than a second preset distance; and determine, according to the number of feature points that meet the preset condition corresponding to the respective candidate first image frame, the first image associated with the anchor point from multiple candidate first image frames.

According to one or more embodiments in the present disclosure, the apparatus further includes a map generating unit, the map generating unit is configured to generate the three dimensional map according to the following steps: collecting multiple frames of scene image by using a collecting device, and recording a pose of the collecting device corresponding to each frame of scene image; extracting feature points of each frame of scene image, and determining at least two frames of scene image comprising a same feature point; determining a three dimensional coordinate of a feature point by using poses of the at least two frames of scene image; acquiring a projection point of the feature point by projecting the feature point for which the three dimensional coordinate is determined into each frame of scene image, and determining the first image frame from the multiple frames of scene image based on a position of the projection point of the feature point in each frame of scene image and an original position of the feature point in the frame of scene image; constructing the three dimensional map based on the first image frame.

According to one or more embodiments in the present disclosure, the three dimensional map is constructed from the first image frame of an image collected by a wearable device, and presented by the wearable device.

As a third aspect, according to one or more embodiments in the present disclosure, there is provided an electronic device, including: at least one processor and a memory; where the memory stores computer executing instructions; and
at least one processor executes the computer executing instructions stored in the memory, so that the at least one processor executes the information processing method described in the first aspect above and in various possible designs of the first aspect.

As a fourth aspect, according to one or more embodiments in the present disclosure, there is provided a computer readable storage medium, the computer readable storage medium stores a computer program, when the computer program is executed by at least one processor, the information processing method as described in the first aspect and various possible designs of the first aspect is implemented.

As a fifth aspect, according to one or more embodiments in the present disclosure, there is provided a computer program product, including a computer program, when the computer program is executed by at least one processor, the information processing method as described in the first aspect and various possible designs of the first aspect is implemented.

The above is only a description of preferred embodiments of the present disclosure and an illustration of applied technical principles. Those skilled in the art should understand that, a disclosure scope involved in the present disclosure is not limited to technical solutions formed by specific combinations of technical features, and should also cover other technical solutions formed by any combination of the above technical features or their equivalent features without departing from a concept of the present disclosure. For example, the technical solution formed by replacing the above features with the technical features with similar functions as those disclosed in the present disclosure (but not limited thereto).

Furthermore, although each operation is depicted in a specific order, this should not be understood as requiring these operations to be executed in the specific order shown or in a sequential order. In certain environments, multitasking and parallel processing may be advantageous. Similarly, although several specific implementation details are included in the above discussion, these should not be interpreted as limiting a scope of the present disclosure. Some features described in the context of an individual embodiment can also be combined and implemented in the individual embodiment. On the contrary, various features described in the context of the individual embodiment can also be implemented separately or in any suitable sub combination in multiple embodiments.

Although a subject matter has been described in language specific to structural features and/or method logical actions, it should be understood that the subject matter limited in the attached claims may not necessarily be limited to the specific features or actions described above. On the contrary, the specific features and actions described above are only exemplary forms for implementing the claims.

The invention claimed is:

1. An information processing method, comprising:
   in response to detecting first change information that a three dimensional map is changed, determining second change information of an anchor point based on the first change information, the anchor point being pre-associated with a first image frame of the three dimensional map;
   adjusting a pose of the anchor point based on the second change information,
   wherein the first change information comprises a third pose of the first image frame after the three dimensional map is changed, and
   wherein in response to detecting the first change information that the three dimensional map is changed, determining the second change information of the anchor point based on the first change information, comprises:
   acquiring an initial first pose of the anchor point relative to the three dimensional map, wherein the initial first pose comprises a pose of the anchor point relative to the three dimensional map before the three dimensional map is changed;
   acquiring an initial second pose of the first image frame in an anchor coordinate system, wherein the initial second pose comprises a pose of the first image frame in the anchor coordinate system before the three dimensional map is changed; and
   determining the second change information based on the initial first pose, the initial second pose, and the third pose.

2. The method according to claim 1, wherein acquiring the initial second pose of the first image frame in the anchor coordinate system, comprises:
   determining the initial second pose based on a pre-constructed first association among a first pose, a second pose and the third pose, and the initial first pose and an initial third pose;
   wherein the first pose is the pose of the anchor point relative to the three dimensional map, the second pose is the pose of the first image frame in the anchor point coordinate system, the third pose is a pose of the first image frame in the three dimensional map, and the initial third pose is a pose of the first image frame in the three dimensional map before the three dimensional map is changed.

3. The method according to claim 1, wherein determining the second change information based on the initial first pose, and the initial second pose and the third pose of each first image frame associated with the anchor point, comprises:
   determining the second change information based on a pre-constructed first association among a first pose, a second pose and the third pose, and the third pose of the first image frame after the three dimensional map is changed, to make a second pose, which is determined based on the first association, a first pose indicated by the second change information, and the third pose after the three dimensional map is changed, approach the initial second pose.

4. The method according to claim 1, wherein the first image frame associated with the anchor point is determined based on the following steps:
   for the three dimensional map before being changed, determining at least one first image frame within a preset range of the anchor point as a candidate first image frame;
   determining, according to a relationship between a position of a projection point for a three dimensional coordinate of a feature point in a respective first image frame and a position of the feature point in a respective candidate first image frame, the first image frame associated with the anchor point from the candidate first image frame.

5. The method according to claim 4, wherein determining, according to the relationship between the position of the projection point for the three dimensional coordinate of the feature point in the respective first image frame and the position of the feature point in the respective candidate first image frame, the first image frame associated with the anchor point from the candidate first image frame, comprises:
   for each candidate first image frame, determining a number of feature points of the candidate first image frame that meet a preset condition, wherein the preset condition comprises: a distance between a position of a projection point for a three dimensional coordinate of a feature point of the candidate first image frame towards the candidate first image frame and a position of the feature point in the candidate first image frame being less than a second preset distance;

determining, according to the number of feature points that meet the preset condition corresponding to the respective candidate first image frame, the first image associated with the anchor point from multiple candidate first image frames.

6. The method according to claim 1, wherein the method further comprises steps of generating the three dimensional map:

collecting multiple frames of scene image by using a collecting device, and recording a pose of the collecting device corresponding to each frame of scene image;

extracting feature points of each frame of scene image, and determining at least two frames of scene image comprising a same feature point;

determining a three dimensional coordinate of a feature point by using poses of the at least two frames of scene image;

acquiring a projection point of the feature point by projecting the feature point for which the three dimensional coordinate is determined into each frame of scene image, and determining the first image frame from the multiple frames of scene image based on a position of the projection point of the feature point in each frame of scene image and an original position of the feature point in the frame of scene image;

constructing the three dimensional map based on the first image frame.

7. The method according to claim 1, wherein the three dimensional map is constructed from the first image frame of an image collected by a wearable device, and presented by the wearable device.

8. An electronic device, comprising at least one processor and a memory;

the memory stores computer execution instructions;

the at least one processor executes the computer execution instructions stored in the memory; wherein the computer execution instructions, when executed by the at least one processor, cause the at least one processor to:

in response to detecting first change information that a three dimensional map is changed, determine second change information of an anchor point based on the first change information, the anchor point being pre-associated with a first image frame of the three dimensional map; and adjust a pose of the anchor point based on the second change information, wherein the first change information comprises a third pose of the first image frame after the three dimensional map is changed, and wherein the at least one processor is caused to:

acquire an initial first pose of the anchor point relative to the three dimensional map, wherein the initial first pose comprises a pose of the anchor point relative to the three dimensional map before the three dimensional map is changed;

acquire an initial second pose of the first image frame in an anchor coordinate system, wherein the initial second pose comprises a pose of the first image frame in the anchor coordinate system before the three dimensional map is changed; and determine the second change information based on the initial first pose, the initial second pose and the third pose.

9. The electronic device according to claim 8, wherein the at least one processor is caused to:

determine the initial second pose based on a pre-constructed first association among a first pose, a second pose and the third pose, and the initial first pose and an initial third pose;

wherein the first pose is the pose of the anchor point relative to the three dimensional map, the second pose is the pose of the first image frame in the anchor point coordinate system, the third pose is a pose of the first image frame in the three dimensional map, and the initial third pose is a pose of the first image frame in the three dimensional map before the three dimensional map is changed.

10. The electronic device according to claim 8, wherein a number of first image frames associated with the anchor point is more than two, the first change information comprises a third pose of each first image frame associated with the anchor point after the three dimensional map is changed;

wherein the at least one processor is caused to:

for each anchor point, acquire an initial first pose of the anchor point relative to the three dimensional map, wherein the initial first pose comprises a pose of the anchor point relative to the three dimensional map before the three dimensional map is changed;

acquire an initial second pose of each first image frame associated with the anchor point in an anchor coordinate system, wherein the initial second pose of the first image frame comprises a pose of the first image frame in the anchor coordinate system before the three dimensional map is changed;

determine the second change information based on the initial first pose, and the initial second pose and the third pose of each first image frame associated with the anchor point.

11. The electronic device according to claim 8, wherein the at least one processor is caused to:

determine the second change information based on a pre-constructed first association among a first pose, a second pose and the third pose, and the third pose of the first image frame after the three dimensional map is changed, to make a second pose, which is determined based on the first association, a first pose indicated by the second change information, and the third pose after the three dimensional map is changed, approach the initial second pose.

12. The electronic device according to claim 8, wherein the first image frame associated with the anchor point is determined;

wherein the at least one processor is caused to:

for the three dimensional map before being changed, determine at least one first image frame within a preset range of the anchor point as a candidate first image frame;

determine, according to a relationship between a position of a projection point for a three dimensional coordinate of a feature point in a respective first image frame and a position of the feature point in a respective candidate first image frame, the first image frame associated with the anchor point from the candidate first image frame.

13. The electronic device according to claim 12, wherein the at least one processor is caused to:

for each candidate first image frame, determine a number of feature points of the candidate first image frame that meet a preset condition, wherein the preset condition comprises: a distance between a position of a projection point for a three dimensional coordinate of a feature point of the candidate first image frame towards the candidate first image frame and a position of the feature point in the candidate first image frame being less than a second preset distance;

determine, according to the number of feature points that meet the preset condition corresponding to the respective candidate first image frame, the first image associated with the anchor point from multiple candidate first image frames.

14. The electronic device according to claim 8, wherein the at least one processor is further caused to:
collect multiple frames of scene image by using a collecting device, and record a pose of the collecting device corresponding to each frame of scene image;
extract feature points of each frame of scene image, and determine at least two frames of scene image comprising a same feature point;
determine a three dimensional coordinate of a feature point by using poses of the at least two frames of scene image;
acquire a projection point of the feature point by projecting the feature point for which the three dimensional coordinate is determined into each frame of scene image, and determine the first image frame from the multiple frames of scene image based on a position of the projection point of the feature point in each frame of scene image and an original position of the feature point in the frame of scene image; and
construct the three dimensional map based on the first image frame.

15. A non-transitory computer-readable storage medium in which computer execution instructions are stored, when at least one processor executes the computer execution instructions, the information processing method according to claim 1 is implemented.

16. An information processing method, comprising:
in response to detecting first change information that a three dimensional map is changed, determining second change information of an anchor point based on the first change information, the anchor point being pre-associated with a first image frame of the three dimensional map; and
adjusting a pose of the anchor point based on the second change information,
wherein a number of first image frames associated with the anchor point is more than two, the first change information comprises a third pose of each first image frame associated with the anchor point after the three dimensional map is changed, and
wherein in response to detecting the first change information that the three dimensional map is changed, determining the second change information of the anchor point based on the first change information, comprises:
for each anchor point, acquiring an initial first pose of the anchor point relative to the three dimensional map, wherein the initial first pose comprises a pose of the anchor point relative to the three dimensional map before the three dimensional map is changed;
acquiring an initial second pose of each first image frame associated with the anchor point in an anchor coordinate system, wherein the initial second pose of the first image frame comprises a pose of the first image frame in the anchor coordinate system before the three dimensional map is changed; and
determining the second change information based on the initial first pose, and the initial second pose and the third pose of each first image frame associated with the anchor point.

* * * * *